United States Patent [19]
Hashimoto et al.

[11] Patent Number: 5,969,928
[45] Date of Patent: Oct. 19, 1999

[54] SHUNT FOR CIRCUIT PROTECTION DEVICE

[75] Inventors: Masato Hashimoto, Exeter; William R. Crider, Raymond; Alan F. Wilkinson, Jr., Kensington, all of N.H.; Robert Wilkins, Wirral, United Kingdom; Arnav Mukherjee, Allston, Mass.

[73] Assignee: Gould Electronics Inc., Eastlake, Ohio

[21] Appl. No.: 08/984,487

[22] Filed: Dec. 3, 1997

[51] Int. Cl.[6] .................................................. H02H 5/04
[52] U.S. Cl. ............................................. 361/106; 361/58
[58] Field of Search ....................... 361/106, 58, 10–11, 361/103; 338/22 R, 23; 219/485, 497, 501, 505

[56] References Cited

U.S. PATENT DOCUMENTS

| | | | |
|---|---|---|---|
| 3,886,401 | 5/1975 | Berg | 315/94 |
| 3,916,264 | 10/1975 | Berg | 338/23 |
| 4,005,340 | 1/1977 | Härtel | 317/11 A |
| 4,070,641 | 1/1978 | Khalid | 338/61 |
| 4,071,836 | 1/1978 | Cook et al. | 335/195 |
| 4,093,822 | 6/1978 | Steinle | 179/1 VL |
| 4,093,968 | 6/1978 | Shirey | 361/58 |
| 4,178,618 | 12/1979 | Khalid | 361/58 |
| 4,586,104 | 4/1986 | Standler | 361/91 |
| 4,816,958 | 3/1989 | Belbel et al. | 361/93 |
| 5,148,099 | 9/1992 | Ong | 323/314 |
| 5,150,033 | 9/1992 | Conway | 320/51 |
| 5,495,083 | 2/1996 | Aymami-Pala et al. | 218/1 |
| 5,581,192 | 12/1996 | Shea et al. | 324/722 |
| 5,667,711 | 9/1997 | Mody et al. | 219/505 |

OTHER PUBLICATIONS

"Polymer Current Limiters for Low–Voltage Power Distribution Systems," Mark H. McKinney, Charles W. Brice and Roger A. Dougal, presented at the 1997 Industrial and Commercial Power Systems Technical Conference, May 3–8, 1997.

Primary Examiner—Jeffrey Gaffin
Assistant Examiner—Michael J. Sherry
Attorney, Agent, or Firm—Mark Kusner; Michael A. Centanni

[57] ABSTRACT

A method for determining the resistance of a shunt for use with a current limiting device that exhibits PTC characteristics to protect an electrical circuit. The method comprises steps for determining maximum and minimum resistance values based on operating criteria and component characteristics and selecting resistance values that fall within selected ranges.

10 Claims, 7 Drawing Sheets

SHUNT FOR CIRCUIT PROTECTION DEVICE

FIELD OF THE INVENTION

The present invention relates generally to circuit protection devices, and particularly to shunt devices for use with circuit protection devices. The invention is particularly applicable to circuit protection devices exhibiting positive temperature coefficient ("PTC") characteristics and will be described with particular reference thereto, although the present invention may find advantageous application with other current limiting devices.

BACKGROUND OF THE INVENTION

The use of PTC materials in circuit protection devices for low power applications is well known. These materials find utility as resettable fuses in low power electronic circuits to protect electronic devices. In such use, these PTC materials protect sensitive and expensive electronic components from exposure to harmful, electrical faults. When a fault is experienced by a PTC material, the PTC material heats up and the electrical resistance of the device increases thereby quenching the fault and preventing the fault from continuing in the circuit.

A PTC material may be used on its own as a current limiting device in low-voltage systems where there is very little circuit inductance. In these applications, as the PTC material transitions to its high-electrical-resistance state, the electrical current is almost instantaneously reduced thereby limiting the voltage across the PTC material. In addition, the power absorbed by the PTC material is also drastically reduced. This further limits the heat to which the PTC material itself is exposed.

In higher power systems, however, the electrical current does not drop off quickly because of the presence of inductive reactance. In higher power applications, as the PTC material is exposed to a fault and begins to transition to a highly, electrically resistive state, the PTC material would be exposed to enormous voltages and to enormous internal power dissipations. Energies absorbed could swell up to tens of kilo-joules. At these levels, the host of the PTC material would most likely thermally destruct and possibly even ignite.

The present invention overcomes this and other problems and provides a shunt device for use with a PTC material for high power applications to absorb and dissipate energy resulting from an impressed fault.

SUMMARY OF THE INVENTION

In accordance with the present invention, there is provided a method for determining the resistance of a shunt for use with a current limiting device to protect an electrical circuit, the current limiting device exhibiting PTC characteristics and having a predetermined current carrying capacity, a lower resistance at the predetermined current carrying capacity and an upper resistance when the current limiting device is exposed to a current that exceeds the predetermined current carrying capacity. The method is comprised of the following steps:

(1) establishing a maximum current value to be carried by the shunt when the current limiting device is at the predetermined current carrying capacity;

(2) determining a minimum resistance for the shunt to enable the shunt to carry the maximum amount of current when the current limiting device is operating at the predetermined current carrying capacity;

(3) establishing a maximum voltage value the circuit to be protected can withstand;

(4) determining a maximum resistance for the shunt, such that a voltage rise established across the shunt when the current limiting device switches from the lower resistance to the upper resistance will not exceed the maximum voltage value;

(5) determining a maximum resistance for the shunt such that the current limiting device will not thermally degrade when the current limiting device switches from the lower resistance to the higher resistance;

(6) determining a minimum resistance for the shunt based upon a breaking capacity of a switching device in series with a parallel configuration of the current limiting polymer device and the shunt; and (7) selecting a resistance value for the shunt device from values between the maximum of the minimum resistances and the minimum of the maximum resistances.

It is an object of the present invention to provide a circuit protection device to protect electrical components from fault conditions.

It is another object of the present invention to provide a circuit protection device having a current limiting device exhibiting positive temperature coefficient (PTC) characteristics and a shunt device to absorb and dissipate power from said current limiting device during a fault condition.

It is another object of the present invention to provide a shunt device as described above for use with current limiting devices exhibiting PTC characteristics that is operable at high power ratings.

It is a further object of the present invention to provide a circuit protection device as described above for the protection of electric motor starters and high power equipment.

It is a further object of the present invention to provide a circuit protection device as described above for use with loads that require from about 15 to about 100 amperes of electric current at about 600 volts, and more particularly, that operate at about 15, 30, 60 or 100 amperes at about 600 volts.

It is a further object of the present invention to provide a shunt device for use with a current limiting device exhibiting PTC characteristics, the shunt being made of stainless steel, nichrome, tungsten, refractory metals or refractory metal alloys, an electrically conductive composite such as an electrically conductive ceramic, ceramic alloy or an electrically conductive polymeric composite.

It is another object of the present invention to provide a circuit protection device as described above, wherein the shunt device is placed in a position such that heat lost from the shunt device is transferred to the current limiting device so as to maintain the temperature of the current limiting device above its switching temperature, thereby clamping the PTC characteristics of the current limiting device in its highly resistive state.

These and other objects will become apparent from the following description of a preferred embodiment taken together with the accompanying drawings and the appended claims.

BRIEF DESCRIPTION OF THE DRAWINGS

A preferred embodiment of the invention will be described in detail in the specification and illustrated in the accompanying drawings which form a part hereof, and wherein.

DETAILED DESCRIPTION OF THE PREFERRED EMBODIMENT

Figure 1:
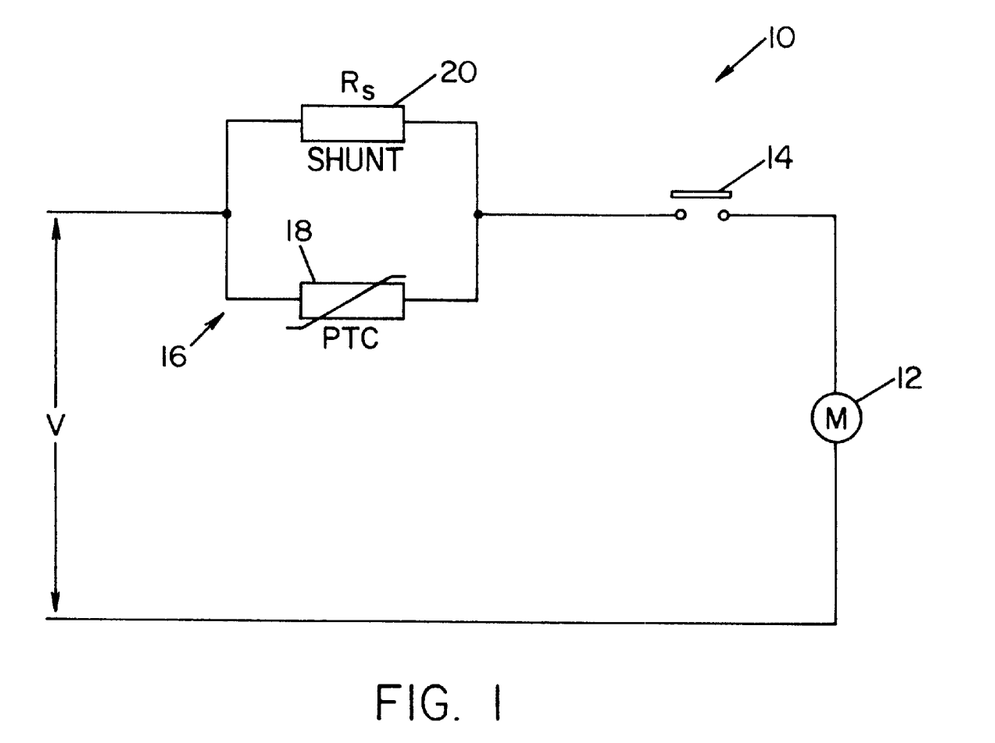
FIG. 1 is a circuit diagram schematically illustrating a current protection device comprised of a current limiting device exhibiting PTC characteristics and a shunt device according to the present invention.

Referring now to the drawings wherein the purpose is for illustrating preferred embodiments of the present invention, and not for the purpose of limiting same, FIG. 1 is a schematic representation of a circuit, designated 10, for controlling current to a motor 12. Circuit 10 includes a contactor 14 and a circuit protection device 16, illustrating a preferred embodiment of the present invention. Circuit protection device 16 is intended for use in high current applications, i.e., high power applications where a PTC material would be exposed to large voltages, and will be described with reference thereto. Circuit protection device 16 is comprised of a current limiting device 18 that exhibits positive temperature coefficient (PTC) characteristics together with a shunt device 20.

Circuit protection device 16 is provided to prevent exposure of circuit 10 to current spikes during fault conditions and to absorb and subsequently dissipate energy during such fault conditions until contactor 14 can open to break circuit 10. In other words, circuit protection device 16 is provided to drop current during a fault condition sufficiently to insure that circuit components are not damaged by over current.

Referring now to current limiting device 18, such device is provided within circuit 10 to protect components within circuit 10 from current overloads. In other words, current limiting device 18 is provided to cause a drop in current during overload. In accordance with the present invention, current limiting device 18 is a PTC material having a lower resistance value at a normal operating current, selected to match the operating current limits of circuit 10, and a higher resistance value under fault conditions.

The nature and operation of device 18 is best understood by considering the composition of a typical current limiting device, and the mechanical and electrical responses of the device to an electrical fault. Current limiting devices are typically formed of a positive temperature coefficient (PTC) material that is generally composed of two primary components: 1) a host material, and 2) electrically conductive particles dispersed within the host material. The electrically conductive particles are present in the host material to an extent that the resultant composition conducts electricity well (the minimum concentration, termed the percolation threshold, typically expresses a volume concentration of electrically conductive particles necessary and sufficient to provide an electrically conductive composite).

When a fault is experienced by a PTC material, the PTC material heats up and expands, thereby separating the electrically conductive particles from each other, thus increasing the electrical resistance of the device, thereby quenching the fault and preventing the fault from continuing in the circuit. The aforementioned heating of the PTC material is caused by the joule heat it produces when the PTC material experiences an electrical fault. This heat is sometimes referred to as "i-squared-r" heat, as the heat produced is equal to the square of the DC electrical current times the resistance of the PTC device times the time (seconds). For an AC signal, the average i-squared-r heat generated equals the square of the root-mean-square current times the resistance of the PTC device times the time (seconds). The joule heat is actually the power in watts multiplied by the time that is developed by the PTC material as it experiences an electrical fault.

The rapidity at which the PTC material transitions from a highly electrically conductive state to a highly electrically resistive state determines to a large extent the inductively induced voltage experienced by the circuit to be protected during fault conditions. With respect to shunt 20, the ratio of the resistances of the two states of the PTC material is important in determining the load carrying capacity of the shunt. In this respect, the current and voltage to be impressed upon the PTC material, as well as the normal operating parameters of the circuit, must be considered in designing a shunt 20. The physical and electrical properties of the shunt itself, i.e., the size, shape and material makeup of the shunt, must also be considered in the ultimate shape and design of the shunt.

In accordance with the present invention, shunt 20 is determined based upon seven criteria, which establish an optimum shunt design for a specific PTC material and electrical circuit load. The seven (7) criteria are: (1) a minimum shunt resistance based upon a maximum fraction of electrical current carried by a current limiting polymer device; (2) a maximum shunt resistance based upon an I²t switching and peak voltage of a current limiting polymer device; (3) a maximum shunt resistance based upon a positive temperature coefficient of the current limiting polymer device; (4) a minimum shunt resistance based upon an amount of switching energy absorbed by the shunt until a switch device opens the circuit; (5) a minimum shunt resistance based upon the breaking capacity of a switching device in series with a parallel configuration of the current limiting polymer device and the shunt; (6) a maximum shunt resistance based upon an allowable length of the shunt; and (7) the maximum allowable weight of the shunt.

The present invention shall be described in greater detail, wherein the following abbreviations are used:

i=instantaneous current of short circuit alternating current supply (amps)

$i_1$=current at instant of switching (amps)

I=root-mean-square short circuit current (amps)

$I_s$=current through shunt (amps)

$I_{bc}$=current capacity of switching device (amps)

t=time (seconds)

$t_1$=time at instant of switching (seconds)
$T_s$=time from commutation of current protection device until contactor opens (seconds)
$\omega$=angular frequency (hertz)
$R_s$=resistance of shunt (ohms)
$R_{PTC}$=resistance of PTC material (ohms)
$R_{PTC-L}$=low resistance of PTC material (ohms)
$R_{PTC-H}$=high resistance of PTC material (ohms)
$\rho$=electrical resistivity of specific material (ohm-cm)
$\rho_m$=mass density (grams/cm$^3$)
V=voltage (volts)
$V_s$=voltage across shunt (volts)
$V_{pmax}$=maximum voltage limit (volts)
$V_{source}$=voltage of source (volts)
L=inductance (henry)
$L_{max}$=maximum length of shunt (m)
Z=impedance (ohms)
S=cross-section area of shunt (mm$^2$)
$W_{max}$=maximum mass of shunt (grams)
$\alpha = R_{PTC-L}/R_s$ (no units)

(A) Current Through the Shunt Under Normal Load Conditions

Under normal operating conditions, current limiting device 18, i.e., the PTC material, is designed to carry most of the electrical current of circuit protection device 16, while shunt device 20 is designed to carry only a fraction ($\alpha$) of the total current flowing through circuit protection device 16. In other words, the resistance of the shunt must be such that under normal operating conditions, i.e., when the PTC material is in its low resistance $R_{PTC-L}$ state, the shunt will carry little of the current flowing through circuit protection device 16.

The resistance of shunt device 20 may be 1000 times larger than the low resistance value $R_{PTC-L}$ of the PTC material, but is preferably about 500 times larger, and more preferably about 100 times larger. In this respect, at 100 times larger, $\alpha$ would equal 1/100th or 1% of $R_{PTC-L}$.

Thus, the resistance of shunt device 20 must be always greater than the resistance $R_{PTC-L}$ of the PTC material during normal operation. This requires that:

$$R_S > R_{PTC-L}/\alpha; \qquad (1)$$

where $R_S$ is the electrical resistance of the shunt and $R_{PTC-L}$ is the low electrical resistance value of the PTC material of shunt device 20 under normal operating conditions. In other words, $R_{PTC-L}/\alpha$ represents a minimum value of the resistance $R_S$ of shunt device 20 so that current limiting device 18 carries most of the current during normal operating conditions. For example, when $\alpha$=1%, 99% of the current flowing into circuit protection device 16 flows through PTC device 18 under normal operating conditions.

(B) Maximum Shunt Resistance Based on the Limitation of Peak Voltage by Coordination with PTC I$^2$t Switching During a fault condition, shunt device 20 must be designed, and must operate, such that the voltage rise across circuit protection device 16 does not exceed the maximum voltage the circuit to be protected can withstand without damage. In this respect, the resistance of shunt device 20 must be based on the current switching characteristics of the PTC material of current limiting device 18.

In the present invention, a high level, symmetrical, short-circuit, alternating current supply (I) with a supply angular frequency of $\omega$ is presumed. I is the root-mean-square value of the short-circuit, alternating current supply. The instantaneous current of this short-circuit, alternating current supply then varies sinusoidally as follows:

$$i=(\sqrt{2})(I)\sin(\omega t). \qquad (2)$$

The initial rate of rise of the current is given by the first time derivative of the current:

$$di/dt=(\sqrt{2})(I)(\omega)\cos(\omega t). \qquad (3)$$

At t=0, the derivative equals:

$$di/dt=(\sqrt{2})(I)(\omega). \qquad (4)$$

For ease of representation, $(\sqrt{2})(I)(\omega)$ shall be designated as k. The current and time at the instant of switching shall be designated as $i_1$ and $t_1$ respectively. For a triangular wave form, a constant switching of I$^2$t, designated as P, is given by:

$$P=i_1^2 t_1/3. \qquad (5)$$

(Note that I$^2$t is simply the energy per unit resistance.)

The initial current $i_1$ is equal to $(di/dt)t_1=(k)(t_1)$. Taking this fact into account and rearranging equation (5), it is seen that:

$$P=(k^2)(t_1)^3/3. \qquad (6)$$

Further rearrangement yields:

$$i_1=(3\sqrt{2}\omega IP)^{1/3}. \qquad (7)$$

At the instant of switching, the circuit current is commutated from the PTC material of current limiting device 18 to shunt device 20, producing a voltage rise across circuit protection device 16. This voltage rise across circuit protection device 16 equals the product of that portion of $i_1$ that is carried by shunt device 20 and resistance $R_S$ of shunt device 20. As indicated above, this voltage rise must be less than an allowable system over-voltage power limit $V_{pmax}$. The foregoing establishes a maximum value for resistance $R_S$ of shunt device 20. That is, the shunt resistance must satisfy the following requirement:

$$R_S < V_{pmax}/[3(\sqrt{2})\omega IP]^{1/3}. \qquad (8)$$

(C) Coordination of the Shunt Resistance with the Positive Temperature Coefficient Magnitude of the PTC Material The positive temperature coefficient ("PTC") magnitude of the PTC material of current limiting device 18 is the ratio of the electrical resistance of the PTC material in its highly resistive state $R_{PTC-H}$ (i.e., the resistance of the PTC material after switching during a fault condition) to the electrical resistance of the PTC material in its lower resistive state $R_{PTC-L}$ (i.e., before switching during normal circuit operation). The transference of current from the PTC material of current limiting device 18 to shunt device 20 as described in section (B), supra, must be achieved very quickly to avoid thermal damage to the PTC material. If the current is not commutated quickly from the PTC material to shunt device 20, the joule heat produced by the PTC material may overheat the PTC material and cause thermal damage to the PTC material.

Accordingly, the resistance of the PTC material must switch to a value that is higher than the ratio of the resistance of shunt device 20 to the low resistance of the PTC material, i.e., $R_S/R_{PTC-L}$, raised to some power, where $R_{PTC-L}$ is the electrical resistance of the PTC material when it is carrying current under normal conditions and operating under a no-fault condition. If this criterion is met, sufficient electrical current will be diverted from the PTC material of the current limiting device 18 to shunt device 20 to prevent significant thermal degradation of the PTC material of the current limiting device 18.

The ratio of the resistance of shunt device 20 to the resistance of the PTC material of current limiting device 18 in its low resistance state raised to the power of N, must be less than the PTC coefficient, wherein N is determined by calculating the slope of a log—log plot of log (PTC) versus log $(R_S/R_{PTC-L})^N$. Inasmuch as the relationship between the PTC coefficient and the ratio of the resistance of shunt device 20 to the resistance of the PTC material in its low resistance state is a power law, the log—log plot will yield a straight line whose slope will be equal to N. The relationship is given by:

$$PTC > [R_S/R_{PTC-L}]^N; \qquad (9)$$

where $N = \log PTC/\log(R_S/R_{PTC-L}) \approx 2.2$. Equation (9) thus provides a further limitation on the value of the resistance $R_S$ of shunt device 20. Specifically, $$R_S < R_{PTC-L}(PTC)^{1/N}. \qquad (10)$$

(D) Coordination of the Shunt Resistance vis-a-vis the Breaking Capacity of the Series Switching Device After the fault current has been limited by current limiting device 18, the resistance of shunt device 20 must limit the current to a value that lies within the current capacity ($I_{bc}$) of the series switching device, e.g. contactor 14, i.e., the device that is in series with the parallel configuration of the PTC material and the shunt resistor and that is in-line after the PTC material/shunt resistor system but before the load. The purpose of this series switching device is to control motor 12 and to break the connection between the power source and the load in the event of a fault. For a three (3) phase system, this requires that:

$$R_S > V_S/(\sqrt{3})I_{bc}. \qquad (11)$$

The foregoing four factors, i.e., factors A, B, C and D, basically establish, respectively, maximum and minimum resistance values for shunt device 20 to meet the operating criteria established by each factor. In this respect, once the operating parameters of the circuit to be protected are established, i.e., the normal operating current and the maximum current and voltage the devices to be protected can withstand without damage, the operating parameters of the PTC material of current limiting device 18 may be established. With these parameters, through the foregoing calculations, a resistance value for shunt device 20 can be established. So long as a "minimum resistance" as determined by equations (1) and (11) does not exceed a maximum resistance as determined by equations (8) and (10), a range of resistance values can be obtained from the calculated minimum and maximum resistance values. In accordance with one aspect of the present invention, a resistance value for shunt device 20 may be established by selecting a resistance value between the larger value of the minimum resistances determined by equations (1) and (11) and the lesser value of the maximum resistances determined by equations (8) and (10).

The foregoing factors, as heretofore described, relate generally to the resistance values of shunt device 20 as related to the circuit to be protected and the operating characteristics of the PTC material of current limiting device 18. In accordance with another aspect of the present invention, once a resistance value for shunt device 20 is selected from the range of values established by equations (1), (8), (10) and (11), a cross-sectional value (i.e., dimension) can be determined based on several other "factors" relating to the material and shape of shunt device 20. In this respect, in addition to factors A, B, C and D, the resistance of shunt device 20 is based upon the material(s) forming shunt device 20, as well as the shape and weight of shunt device 20. Shunt device 20 may be formed of metal, ceramics, organics or conductive polymeric materials, and may have shapes ranging from short blocks to elongated wires. The following discussion factors E, F and G relate generally to the physical makeup and composition of shunt device 20, and specifically to a shunt device 20 formed of an elongated, metallic wire element.

(E) Absorption of Switching Energy by the Shunt Device 20

After the current has commutated from current limiting device 18 to shunt device 20, shunt device 20 must carry almost all of the current up to the time ($T_S$) when a series switching device, e.g., contactor 14, opens and isolates the circuit. Accordingly, another design requirement is that shunt device 20 be able to absorb and subsequently dissipate the energy of the fault without thermal breakdown (i.e., without melting in the case of metal devices). The design of shunt device 20 must therefore take into account the physical properties and dimensions of the material and elements forming shunt device 20.

Two (2) important sources of energy are absorbed by shunt device 20: (1) the energy stored in the magnetic field at the moment switching begins; and, (2) the energy delivered from the alternating current source over a time $T_S$. In the following discussion, both of these energies shall be considered on a per unit resistance basis. Since the joule heat (actually a power in joules/second) produced by shunt device 20 is $I_S^2 R_S$, the total joule heat energy will be this power times the total time $T_S$. The total energy-output per unit resistance equals $I_S^2 T_S$. This equation can be rewritten in terms of the voltage and shunt resistance as $[V_{Source}/R_S]^2 T_S$; where $V_{Source}$ is the source voltage for a fault. For a three (3) phase system, this equation becomes:

$$\{V_{Source}/[(\sqrt{3})(R_S)]\}^2 T_S; \qquad (12)$$

where the voltage at fault is the source voltage ($V_{Source}$) divided by ($\sqrt{3}$).

The energy per unit resistance initially dispelled through the inductive field is given by $(\frac{1}{2})L i_1^2/R_S$; where L is the inductance of circuit 10 and $R_S$ is the electrical resistance of shunt device 20. At the moment of switching, the inductive energy per unit resistance will be large because of two reasons: (1) at the moment of switching, the current $i_1$ is large as current from the PTC material of current limiting device 18 is commutated into shunt device 20; and, (2) the energy produced is proportional to the square of the current.

The inductance is given by the product of the impedance (Z) and the sine of the phase angle between the voltage and the current (the phase angle equaling $\Phi$) divided by the angular frequency $\omega$. As previously stated, the energy per unit resistance in the inductive field is equal to:

$$\text{Energy} = (\frac{1}{2})L i_1^2/R_S. \qquad (13)$$

Since the inductance L can be written in terms of the impedance (Z), the inductance equals:

$$L = Z\sin(\Phi)/\omega. \qquad (14)$$

For a three (3) phase system, the impedance equals:

$$Z = V_{Source}/[(\sqrt{3})I]. \qquad (15)$$

Combining equations (7), (13), (14) and (15), the energy per unit resistance delivered from the magnetic field equals:

$$V_{Source}\sin(\Phi)\{[3(\sqrt{2})\omega IP]^{1/3}\}^2/2(\sqrt{3})(IR_S)(\omega). \quad (16)$$

Simplified, this equals:

$$(1.31)V_{Source}\sin(\Phi)P^{0.666}/(\sqrt{3})(I\omega)^{0.333}R_S. \quad (17)$$

Therefore, combining equations (12) and (17), the total energy absorbed equals:

$$(1.31)V_{Source}\sin(\Phi)P^{0.666}/(\sqrt{3})(I\omega)^{0.333}R_S + \{V_{Source}/[(\sqrt{3})(R_S)]\}^2 T_S; \quad (18)$$

where $V_{Source}$ is the root-mean-square supply voltage and $\Phi$ is the power-factor angle of the supply circuit.

This total energy, i.e., the total energy represented by equation (18), must be less than the product of Meyer's constant for the material forming shunt device 20 and the square of the cross-sectional area of the shunt material, i.e.:

$$(1.31)V_{Source}\sin(\Phi)P^{0.666}/(\sqrt{3})(I\omega)^{0.333}R_S + \{V_{Source}/[(\sqrt{3})(R_S)]\}^2 T_S < K_M S^2; \quad (19)$$

where $K_M$ is Meyer's constant, otherwise, the shunt would thermally degrade upon absorbing all of the energy given by equation (18). Meyer's constant, for a specified ambient temperature, depends only on the thermophysical properties of the shunt element and so is a constant for a given material.

(F) Restrictions on the Allowable Length of the Shunt

In determining the physical and operating characteristics of shunt device 20, design criteria may place certain size and shape restrictions on the elements forming shunt device 20. For example, size, cost or other commercial considerations may limit the allowable length of shunt device 20. The following discussion relates to a shunt formed from an elongated wire of a predetermined material. If the maximum length of the elongated wire element is determined, the following basic resistance formula establishes the required relationship between the resistance $R_S$ of shunt device 20 and the cross-sectional area, S, of the wire forming shunt device 20:

$$R_S < \rho L_{max}/S; \quad (20)$$

where $\rho$ is the electrical resistivity of the material used and $L_{max}$ is the maximum length of the wire.

(G) Restrictions on the Allowable Weight of the Shunt

It may also be necessary to limit the weight, W, of shunt device 20. As above, size, cost and other commercial considerations may also limit the allowable weight of shunt device 20. Using $W = \rho_m(L_{max})(S)$, where $\rho_m$ is the mass density of the material forming shunt device 20, and the basic resistance formula given by equation (20), the equation relating $R_S$ to the maximum allowable weight may be derived and written as follows:

$$R_S < \rho W_{max}/\rho_m S^2. \quad (21)$$

In summary, by using the foregoing factors and calculations, the resistance value for a shunt device 20 can be determined for a shunt device used in a particular circuit and with a particular PTC material. Further, for a particular resistance value, a cross-sectional area for a specific material can be established based on design characteristics of shunt device 20, i.e., its shape, length and weight.

According to the present invention, the resistance of shunt device 20, to be used in parallel with a current limiting device 18, may be determined by inputting the appropriate values in equations (1), (8), (10), (11), i.e., Factors A, B, C and D, and determining minimum and maximum values for the resistance of shunt 20. It will be noted that equations (1), (8), (10) and (11) will result in fixed values for the resistance of shunt device 20. Equations (19), (20) and (21), i.e., Factors E, F and G, determine the cross-sectional area of a particular shunt device 20 based upon design parameters of the material used to form shunt device 20.

Broadly stated, the present invention relates to a circuit protection device comprised of a current limiting device having PTC characteristics and a shunt, and a method of designing a shunt for use with the PTC device. The circuit protection device 16 is designed based upon the aforementioned factors, and the method involves the calculation of a sufficient number of minima and maxima shunt resistance values so that a plot may be constructed, the desired operating parameters for shunt device 20 being defined by minimum and maximum values determined by the foregoing calculations.

In accordance with one aspect of the present invention, the resistance of shunt device 20 may be determined by plotting the values determined by equations (1), (8), (10), (11), (19), (20) and (21), preferably on a log—log plot of shunt cross-sectional area versus shunt resistance. Each value determined by equations (1), (8), (10) and (11) will result in a straight vertical or horizontal line on such a graph, whereas equations (19), (20) and (21) provide lines that cut diagonally across the straight lines defined by equations (1), (8), (10) and (11). When plotted, the intersecting lines form a window (hereinafter the "operating window"), the area within defining optimum values for the resistance of shunt device 20 and the cross-sectional area for such a device.

Although four (4) intersecting lines are sufficient to define an operating window, seven (7) minima and maxima are calculated as it is difficult to determine a priori which minimum and maximum values are going to define the perimeter of the operating window.

It will thus be understood that it is necessary to determine at least two minima and at least two maxima to construct an operating window from which to select a shunt for use with a specific PTC material, given predetermined operating conditions. In the present invention, a total of seven (7) minima and maxima (i.e., three minima and four maxima) are calculated and plotted as straight lines on a log—log plot. An operating window is defined by the maximum of all minima and the minimum of all maxima, thereby satisfying the criteria that all minima and all maxima be met.

In accordance with another aspect of the present invention, a resistance for shunt device 20 and the cross-sectional area thereof may be established through a method not involving the plotting of a graph. In this respect, a method of determining the resistance of shunt device 20 includes the steps of determining the maximum and minimum shunt resistances as set forth above under Factors A, B, C and D. Factors A, B, C and D will establish a range of acceptable resistances. A resistance which falls within this acceptable range is chosen and utilized as the resistance value in calculating a range cross-sectional areas based upon factors E, F and G. Factors E, F and G will then provide a range of acceptable cross-sectional areas based upon the selected material, length and weight of the shunt device, as well as upon the selected shunt resistance. In this respect, whereas plotting the respective values on a log—log graph provides a visual indication of an acceptable "window" of resistances and cross-sectional areas, it will be appreciated that a resistance value for shunt device 20, as well as a cross-sectional area for such device, may be determined without the need of actually plotting such values on a log—log graph.

The invention shall now be further described together with the following examples showing application of methods in accordance with the present invention. In the following examples, the methods of the present invention will be used to determine the resistance and cross-sectional area for a shunt device 20 formed from nichrome wire.

EXAMPLE I

The resistance and cross-sectional area for a shunt device 20 made of nichrome wire for use in a parallel combination with a current limiting device 18 rated at fifteen (15) amperes for the protection of motor starters are determined. The inputted values are set forth in ordinary type, whereas calculated values are set forth in bold. The maximum and minimum resistance values established by each "factor" are set forth in bold and underlined.

(A) Current Through the Shunt Under Normal Load Conditions
Resistance of the PTC material=$R_{PTC}$=1.5×10$^{-2}$ Ω
Ratio of the current through=α=0.02
the shunt at steady-state
Calculated minimum shunt resistance=$R_S$=0.750 Ω (calculated from equation (1))

(B) Maximum Shunt Resistance Based on the Limitation of Peak Voltage by Coordination with PTC I$^2$t Switching
RMS Available Fault current=I=1.0×10$^5$ A
Typical switching I$^2$t of PTC=P=268 A$^2$sec
Rate-of-rise of fault current=di/dt=5.33×10$^7$ A/sec (frequency is 60 Hz)
Peak current through PTC device=$i_1$=3499 A
Switching time of PTC device=$t_1$=0.066 msec
Maximum acceptable voltage spike=$V_{pmax}$=3000 V
Maximum shunt resistance=$R_S$=0.857 Ω (calculated from equation (8))

(C) Coordination of the Shunt Resistance with the Positive Temperature Coefficient Magnitude of the PTC Material
Ratio of logPTC/log($R_S/R_{PTC}$)=N=2.2
PTC ratio of PTC material=PTC=2.0×10$^5$
Maximum shunt resistance=$R_S$=3.852 Ω (calculated from equation (10))

(D) Coordination of the Shunt Resistance vis-a-vis the Breaking Capacity of the Series Switching Device
Source voltage=$V_{Source}$=600 V
Number of phases=3
Rated current=15 A
Breaking capacity of contactor=$I_{bc}$=600
Minimum shunt resistance=$R_S$=0.577 Ω (calculated from equation (11))

(E) Absorption of Switching Energy by the Shunt
Source voltage=$V_{Source}$=600 V
Number of phases=3
Meyer's constant of shunt material=$K_M$=4,050 A$^2$sec/mm$^4$
Cross-sectional area of shunt=S=5.27 mm$^2$ (an example)
Switching time of contactor=$T_S$=0.05 sec (or other switching device)
Power factor=cosΦ=0.15
Circuit inductance=L=9.11×10$^{-6}$ H
Stored energy in inductance field=55.8 J
Melting I$^2$t of shunt=112,480 A$^2$sec
Generated I$^2$t by inductance=241 A$^2$sec
Generated I$^2$t by alternating source=112,239 A$^2$sec
Minimum shunt resistance=$R_S$=0.231 Ω (at area=5.27 mm$^2$) (calculated from equation (19) using the cross-sectional area example given above)

(F) Restrictions on the Allowable Length of the Shunt
Resistivity of shunt material=ρ=1.122×10$^{-4}$ Ωcm
Maximum acceptable length of shunt wire=$L_{max}$=150 cm
Maximum shunt resistance=$R_S$=0.319 Ω (calculated from equation (20))

(G) Restrictions on the Allowable Weight of Shunt
Mass density of shunt=ρ=8.31 g/cm$^3$
Maximum acceptable weight of shunt=$W_{max}$=20 g
Maximum shunt resistance=$R_x$=0.097 Ω (calculated from equation (21))

Figure 4:
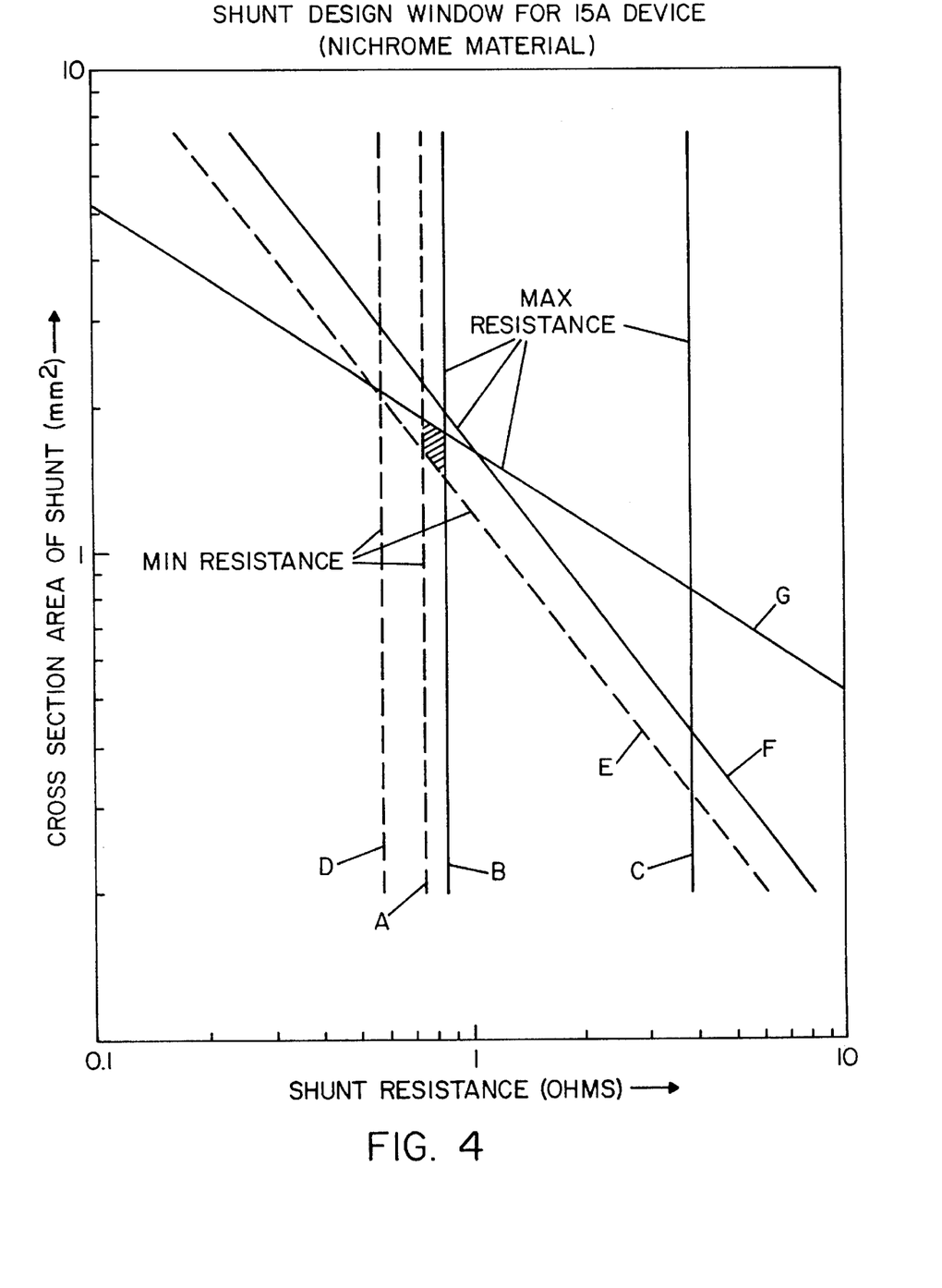
FIG. 4 is a log—log plot of the cross-sectional area of a shunt in mm² versus shunt resistance in ohms for a shunt designed to be used with a FIFTEEN (15) ampere PTC material.

FIG. 4 is a log—log plot of the cross-sectional area of a shunt versus shunt resistance constructed from the minimum and maximum values of the shunt resistances determined according to equations (1), (8), (10), (11), (19), (20) and (21). In FIG. 4, the result of equation (1) is represented by line A; the result of equation (8) is represented by line B; the result of equation (10) is represented by line C; and, the result of equation (11) is represented by line D. Diagonal lines E, F and G are obtained by inputting various cross-sectional areas of the shunt into equations (19), (20) and (21) respectively, determining the corresponding shunt resistances and plotting the ordered pair. The operating window is the area defined by the perimeter of the maximum of the minima and the minimum of the maxima so that any shunt resistance selected from within the operating window satisfies all of the minima and maxima criteria.

EXAMPLE II

The resistance and cross-sectional area for a shunt device 20 made of nichrome wire for use in a parallel combination with a current limiting device 18 rated at thirty (30) amperes for the protection of motor starters are determined. The inputted values are set forth in ordinary type, whereas calculated values are set forth in bold. The maximum and minimum resistance values established by each "factor" are set forth in bold and underlined.

(A) Current Through the Shunt Under Normal Load Conditions
Resistance of the PTC material=$R_{PTC}$=5.0×10$^{-3}$ Ω
Ratio of the current through=α=0.01 the shunt at steady-state
Calculated minimum shunt resistance=$R_S$=0.500 Ω (calculated from equation (1))

(B) Maximum Shunt Resistance Based on the Limitation of Peak Voltage by Coordination with PTC I$^2$t Switching
RMS Available Fault current=I=1.0×10$^5$ A
Typical switching I$^2$t of PTC=P=782 A$^2$sec
Rate-of-rise of fault current=di/dt=5.33×10$^7$ A/sec (frequency is 60 Hz)
Peak current through PTC device=$i_1$=5001 A
Switching time of PTC device=$t_1$=0.094 msec
Maximum acceptable voltage spike=$V_{pmax}$=3000 V
Maximum shunt resistance=$R_S$=0.6 Ω (calculated from equation (8))

(C) Coordination of the Shunt Resistance with the Positive Temperature Coefficient Magnitude of the PTC Material
Ratio of logPTC/log($R_S/R_{PTC}$)=N=2.2
PTC ratio of PTC material=PTC=2.0×10$^5$
Maximum shunt resistance=$R_S$=1.3 Ω (calculated from equation (10))

(D) Coordination of the Shunt Resistance vis-a-vis the Breaking Capacity of the Series Switching Device
Source voltage=$V_{Source}$=600 V
Number of phases=3
Rated current=30 A
Breaking capacity of contactor=$I_{bc}$=600

Minimum shunt resistance=$R_S$=0.577 Ω (calculated from equation (11))

(E) Absorption of Switching Energy by the Shunt
Source voltage=$V_{Source}$=600 V
Number of phases=3
Meyer's constant of shunt material=$K_M$=4,050 A²sec/mm⁴
Cross-sectional area of shunt=S=5.27 mm² (an example)
Switching time of contactor=$T_S$=0.05 sec (or other switching device)
Power factor=cosΦ=0.15
Circuit inductance=L=9.11×10⁻⁶ H
Stored energy in inductance field=113.9 J
Melting I²t of shunt=112,480 A²sec
Generated I²t by inductance=492 A²sec
Generated I²t by alternating source=111,988 A²sec
Minimum shunt resistance=$R_S$=0.231 Ω (at area=5.27 mm²) (calculated from equation (19) using the cross-sectional area example given above)

(F) Restrictions on the Allowable Length of the Shunt
Resistivity of shunt material=ρ=1.122×10⁻⁴ Ωcm
Maximum acceptable length of shunt wire=$L_{max}$=150 cm
Maximum shunt resistance=$R_S$=0.319 Ω (calculated from equation (20))

(G) Restrictions on the Allowable Weight of Shunt
Mass density of shunt=ρ=8.31 g/cm³
Maximum acceptable weight of shunt=$W_{max}$=30 g
Maximum shunt resistance=$R_x$=0.146 Ω (calculated from equation (21))

Figure 5:
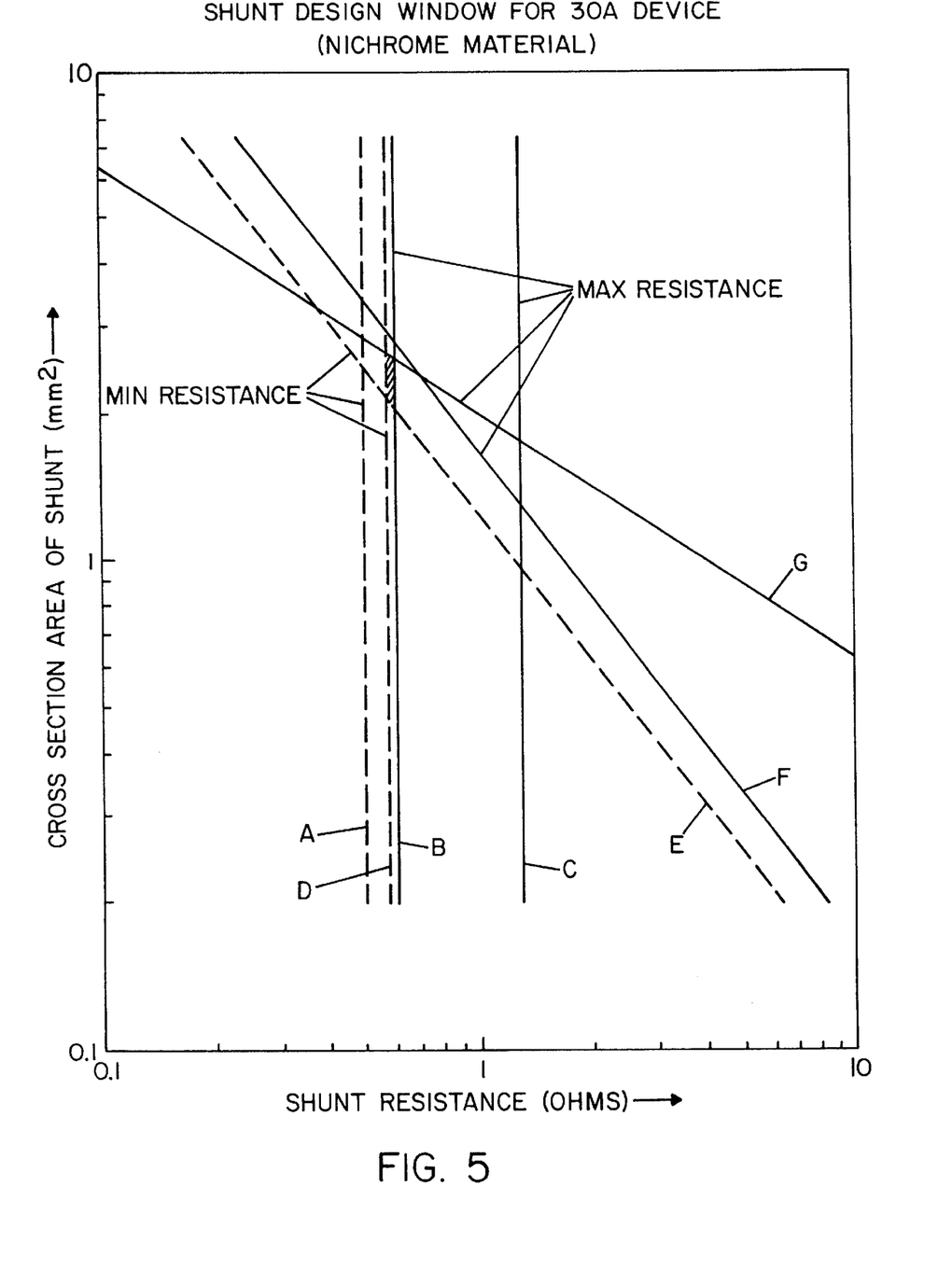
FIG. 5 is a log—log plot of the cross-sectional area of a shunt in mm² versus shunt resistance in ohms for a shunt designed to be used with a THIRTY (30) ampere PTC material.

FIG. 5 is a log—log plot of the cross-sectional area of a shunt versus shunt resistance constructed from the minimum and maximum values of the shunt resistances determined according to equations (1), (8), (10), (11), (19), (20) and (21). In FIG. 5, the result of equation (1) is represented by line A; the result of equation (8) is represented by line B; the result of equation (10) is represented by line C; and, the result of equation (11) is represented by line D. Diagonal lines E, F and G are obtained by inputting various cross-sectional areas of the shunt into equations (19), (20) and (21) respectively, determining the corresponding shunt resistances and plotting the ordered pair. The operating window is the parallelogram defined by the perimeter of the maximum of the minima and the minimum of the maxima so that any shunt resistance selected from within the operating window satisfies all of the minima and maxima criteria.

EXAMPLE III

The resistance and cross-sectional area for a shunt device 20 made of nichrome wire for use in a parallel combination with a current limiting device 18 rated at sixty (60) amperes for the protection of motor starters are determined. The inputted values are set forth in ordinary type, whereas calculated values are set forth in bold. The maximum and minimum resistance values established by each "factor" are set forth in bold and underlined.

(A) Current Through the Shunt Under Normal Load Conditions
Resistance of the PTC material=$R_{PTC}$=1.5×10⁻³ Ω
Ratio of the current through=α=0.01 the shunt at steady-state
Calculated minimum shunt resistance=$R_S$=0.150 Ω (calculated from equation (1))

(B) Maximum Shunt Resistance Based on the Limitation of Peak Voltage by Coordination with PTC I²t Switching
RMS Available Fault current=I=1.0×10⁵ A
Typical switching I²t of PTC=P=2,433 A²sec
Rate-of-rise of fault current=di/dt=5.33×10⁷ A/sec (frequency is 60 Hz)

Peak current through PTC device=$i_1$=7,300 A
Switching time of PTC device=$t_1$=0.137 msec
Maximum acceptable voltage spike=$V_{pmax}$=3000 V
Maximum shunt resistance=$R_S$=0.411 Ω (calculated from equation (8))

(C) Coordination of the Shunt Resistance with the Positive Temperature Coefficient Magnitude of the PTC Material
Ratio of logPTC/log($R_S/R_{PTC}$)=N=2.2
PTC ratio of PTC material=PTC=2.0×10⁵
Maximum shunt resistance=$R_S$=0.385 Ω (calculated from equation (10))

(D) Coordination of the Shunt Resistance vis-a-vis the Breaking Capacity of the Series Switching Device
Source voltage=$V_{Source}$=600 V
Number of phases=3
Rated current=60 A
Breaking capacity of contactor=$I_{bc}$=1,200
Minimum shunt resistance=$R_S$=0.289 Ω (calculated from equation (11))

(E) Absorption of Switching Energy by the Shunt
Source voltage=$V_{Source}$=600 V
Number of phases=3
Meyer's constant of shunt material=$K_M$=4,050 A²sec/mm⁴
Cross-sectional area of shunt=S=5.27 mm² (an example)
Switching time of contactor=$T_S$=0.05 sec (or other switching device)
Power factor=cosΦ=0.15
Circuit inductance=L=9.11×10⁻⁶ H
Stored energy in inductance field=242.7 J
Melting I²t of shunt=112,480 A²sec
Generated I²t by inductance=1,046 A²sec
Generated I²t by alternating source=111,434 A²sec
Minimum shunt resistance=$R_S$=0.232 Ω (at area=5.27 mm²) (calculated from equation (19) using the cross-sectional area example given above)

(F) Restrictions on the Allowable Length of the Shunt
Resistivity of shunt material=ρ=1.122×10⁻⁴ Ωcm
Maximum acceptable length of shunt wire=$L_{max}$=150 cm
Maximum shunt resistance=$R_S$=0.319 Ω (calculated from equation (20))

(G) Restrictions on the Allowable Weight of Shunt
Mass density of shunt=ρ=8.31 g/cm³
Maximum acceptable weight of shunt=$W_{max}$=60 g
Maximum shunt resistance=$R_x$=0.292 Ω (calculated from equation (21))

Figure 6:
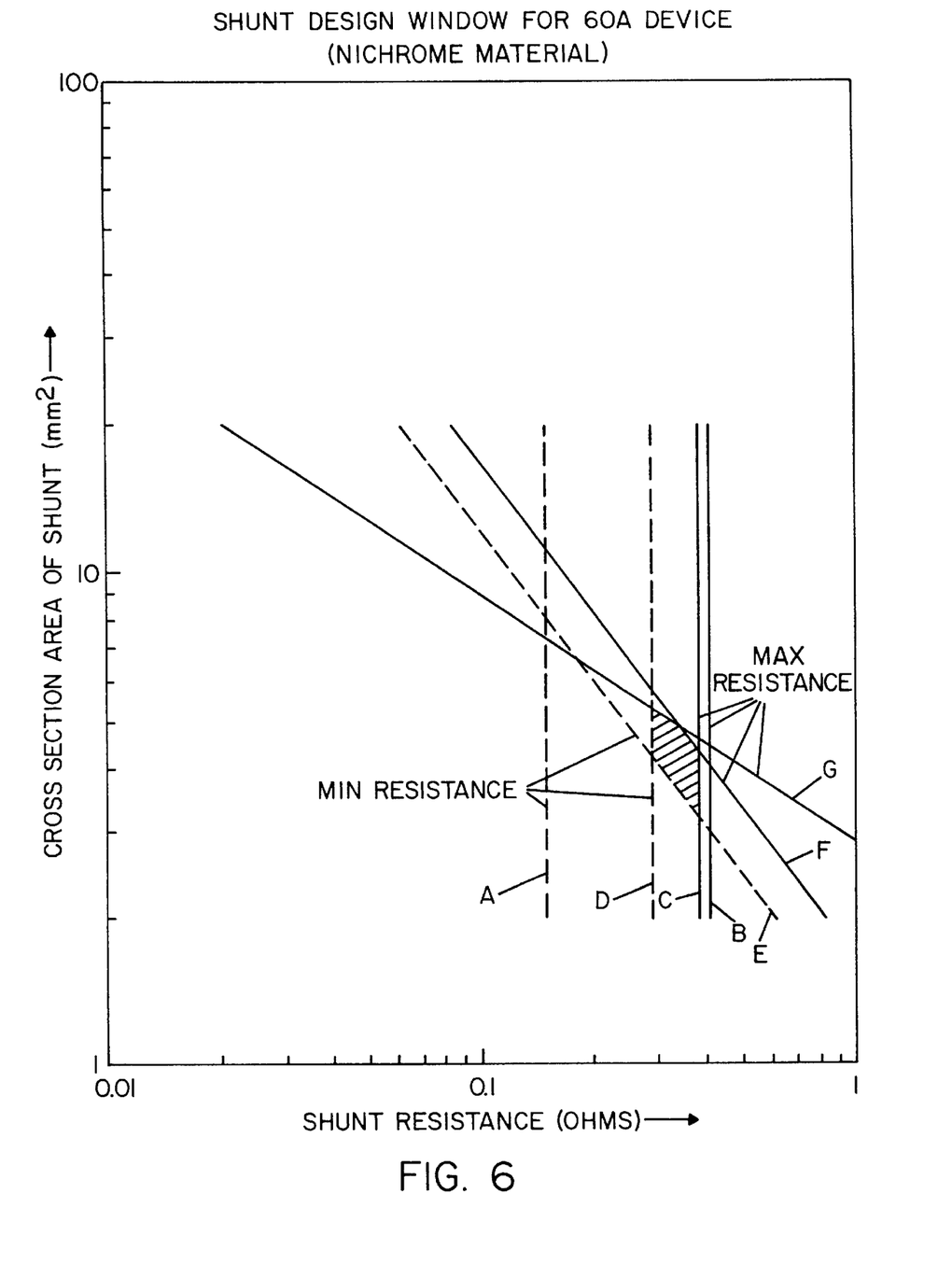
FIG. 6 is a log—log plot of the cross-sectional area of a shunt in mm² versus shunt resistance in ohms for a shunt designed to be used with a SIXTY (60) ampere PTC material.

FIG. 6 is a log—log plot of the cross-sectional area of a shunt versus shunt resistance constructed from the minimum and maximum values of the shunt resistances determined according to equations (1), (8), (10), (11), (19), (20) and (21). In FIG. 6, the result of equation (1) is represented by line A; the result of equation (8) is represented by line B; the result of equation (10) is represented by line C; and, the result of equation (11) is represented by line D. Diagonal lines E, F and G are obtained by inputting various cross-sectional areas of the shunt into equations (19), (20) and (21) respectively, determining the corresponding shunt resistances and plotting the ordered pair. The operating window is the area defined by the perimeter of the maximum of the minima and the minimum of the maxima so that any shunt resistance selected from within the operating window satisfies all of the minima and maxima criteria.

EXAMPLE IV

The resistance and cross-sectional area for a shunt device 20 made of nichrome wire for use in parallel combination with a current limiting device 18 rated for one hundred (100) amperes for the protection of motor starters are determined.

The inputted values are in ordinary type, the calculated values are in bold. The maximum and minimum resistance values established by each "factor" are set forth in bold and underlined.

(A) Current through the Shunt Under Normal Load Conditions
Resistance of the PTC material=$R_{PTC}$=1.0×10$^{-3}$ Ω
Ratio of the current through=α=0.01 the shunt at steady-state
Calculated minimum shunt resistance=$R_S$=0.100 Ω (calculated from equation (1))

(B) Maximum Shunt Resistance Based on the Limitation of Peak Voltage by Coordination with PTC I$^2$t Switching
Fault current=I=1.0×10$^5$ A
Typical switching I$^2$t of PTC P=13,740 A$^2$sec
Rate-of-rise of fault current=di/dt=5.33×10$^7$ A/sec (frequency is 60 Hz)
Peak current through PTC device=$i_1$=13,000 A
Switching time of PTC device=$t_1$=0.244 msec
Maximum acceptable voltage spike=$V_{pmax}$=3000 V
Maximum shunt resistance=$R_S$=0.231 Ω (calculated from equation (8))

(C) Coordination of the Shunt Resistance with the Positive Temperature Coefficient Magnitude of the PTC Material
Ratio of logPTC/log($R_S/R_{PTC}$)=N=2.2
PTC ratio of PTC material=PTC=2.0×10$^5$
Maximum shunt resistance=$R_S$=0.257 Ω (calculated from equation (10))

(D) Coordination of the Shunt Resistance vis-a-vis the Breaking Capacity of the Series Switching Device
Source voltage=$V_{Source}$=600 V
Number of phases=3
Rated current=100 A
Breaking capacity of contactor=$I_{bc}$=2,000
Minimum shunt resistance=$R_S$=0.173 Ω (calculated from equation (11))

(E) Absorption of Switching Energy by the Shunt
Source voltage=$V_{Source}$=600 V
Number of phases=3
Meyer's constant of shunt material=$K_M$=4,050 A$^2$sec/mm$^4$
Cross-sectional area of shunt=S=5.27 mm (an example)
Switching time of contactor=$T_S$=0.05 sec
Power factor=cosΦ=0.15
Circuit inductance=L=9.11×10$^{-6}$ H
Stored energy in inductance field=769.8 J
Melting I$^2$t of shunt=112,480 A$^2$sec
Generated I$^2$t by inductance=3,284 A$^2$sec
Generated I$^2$t by alternating source=109,196 A$^2$sec
Minimum shunt resistance=$R_S$=0.234 Ω (at area=5.27 mm$^2$) (calculated from equation (19) using the cross-sectional area example given above)

(F) Restrictions on the Allowable Length of the Shunt
Resistivity of shunt material=ρ==1.122×10$^{-4}$ Ωcm
Maximum acceptable length of shunt wire=$L_{max}$=150 cm
Maximum shunt resistance=$R_S$=0.319 Ω (calculated from equation (20))

(G) Restrictions on the Allowable Weight of Shunt
Mass density of shunt=ρ=8.31 g/cm$^3$
Maximum acceptable weight of shunt=$W_{max}$=100 g
Maximum shunt resistance=$R_x$=0.486 Ω (calculated from equation (21))

Figure 7:
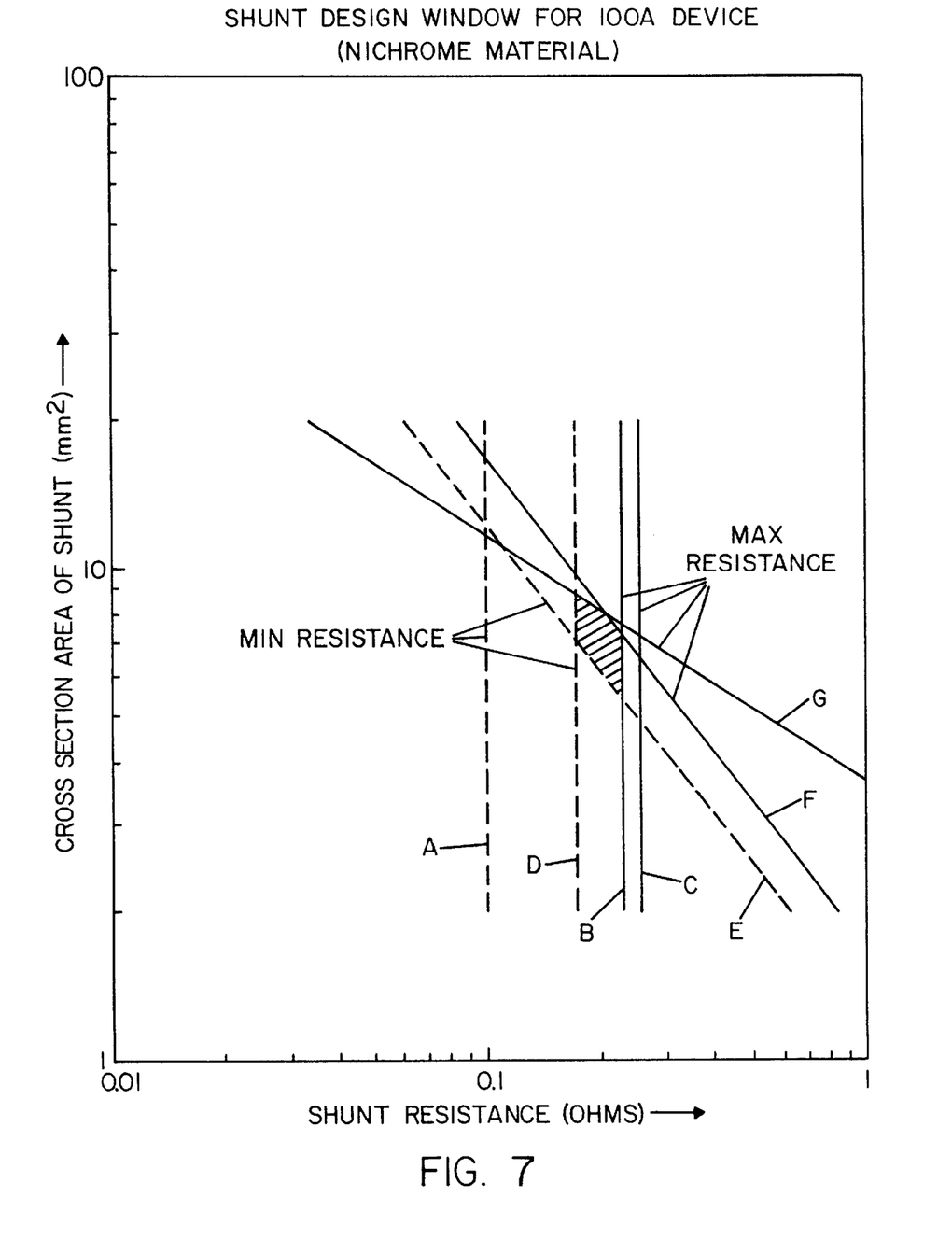
FIG. 7 is a log—log plot of the cross-sectional area of a shunt in mm² versus shunt resistance in ohms for a shunt designed to be used with a ONE HUNDRED (100) ampere PTC material.

FIG. 7 is a log—log plot of the cross-sectional area of a shunt versus shunt resistance constructed from the minimum and maximum values of the shunt resistances determined according to equations (1), (8), (10), (11), (19), (20) and (21). In FIG. 7, the result of equation (1) is represented by line A; the result of equation (8) is represented by line B; the result of equation (10) is represented by line C; and, the result of equation (11) is represented by line D. Diagonal lines E, F and G are obtained by inputting various cross-sectional areas of the shunt into equations (19), (20) and (21) respectively, determining the corresponding shunt resistances and plotting the ordered pair. The operating window is the area defined by the perimeter of the maximum of the minima and the minimum of the maxima so that any shunt resistance selected from within the operating window satisfies all of the minima and maxima criteria.

Figure 8:
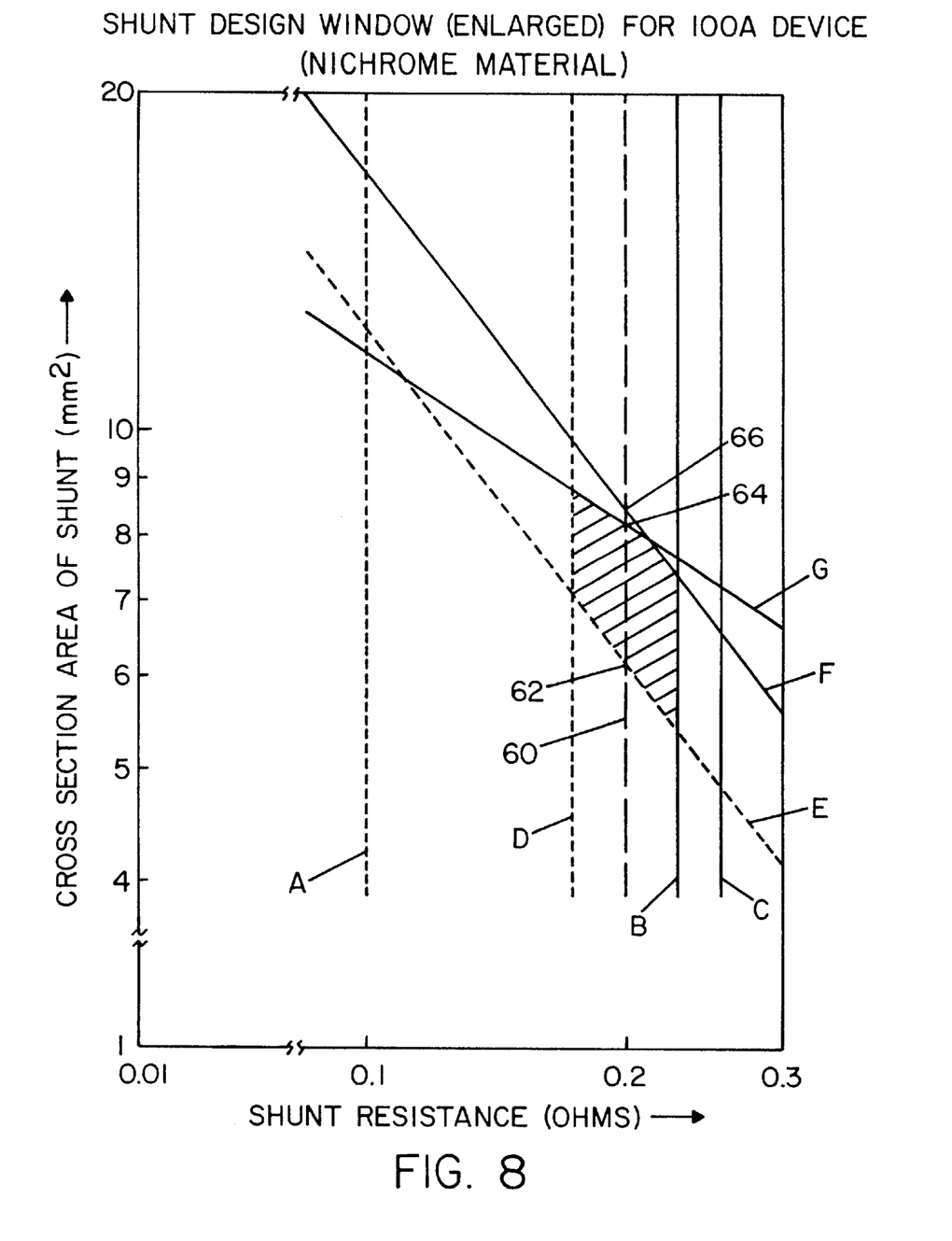
FIG. 8 is an enlarged view of a portion of FIG. 7 illustrating the method of specifying the minimum and maximum values of the cross-sectional areas of a shunt made according to the present invention.

Referring now to FIG. 8, an enlarged view of the shunt design window for the 100 amp device shown in FIG. 7 is illustrated. In the foregoing examples, the shunt window was defined by lines A–G to provide a visual indication of an acceptable range of resistance values and cross-sectional area values for a specific shunt device 20 of a specific material, shape and weight. As indicated above, factors A, B, C and D determine a range of acceptable resistance values. In FIG. 8, this range is established between lines D and B. In FIG. 8, line 60 represents a value selected between lines D and B. In FIG. 8, line 60 represents a shunt resistance of 0.2 ohms. Since this resistance value falls between the resistance values represented by lines D and B, line 60 represents a resistance value which meets the operating parameters determined by factors A, B, C and D. With equations (19), (20) and (21) from Factors E, F and G, cross-sectional values represented by points 62, 64, 66 may be determined. As illustrated in FIG. 8, these values will of course fall on lines E, F and G representative of the cross-sectional areas for a variety of shunt resistances. In the embodiment shown, by selecting a cross-sectional area between points 62 and 64, which in effect are the minimum cross-sectional area, as determined by Factor E, and the least of the maximum cross-sectional areas, as determined by Factors F and G, a range of cross-sectional areas of shunt device 20 for a specific material, shape and weight is established. As will be appreciated, line 60 shown in FIG. 8 is for the purpose of illustration, and that the steps of determining the range of shunt resistances do not require actual plotting of these values on the log—log graph.

Figure 2:
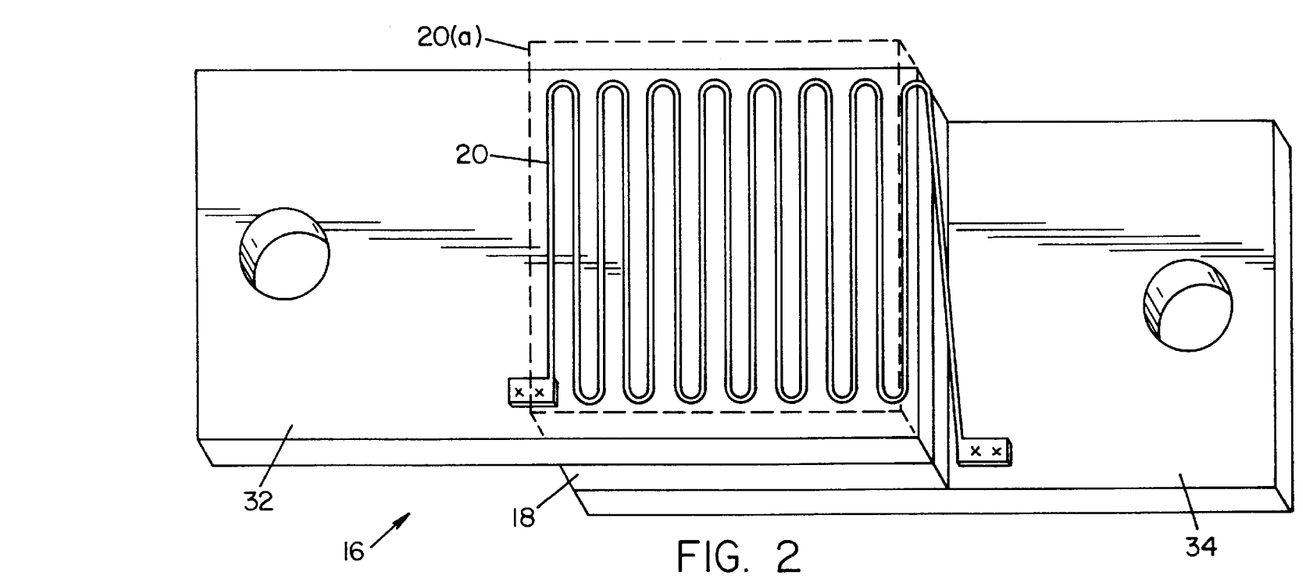
FIG. 2 is a top perspective view of a circuit protection device in accordance with the present invention.
Figure 3:
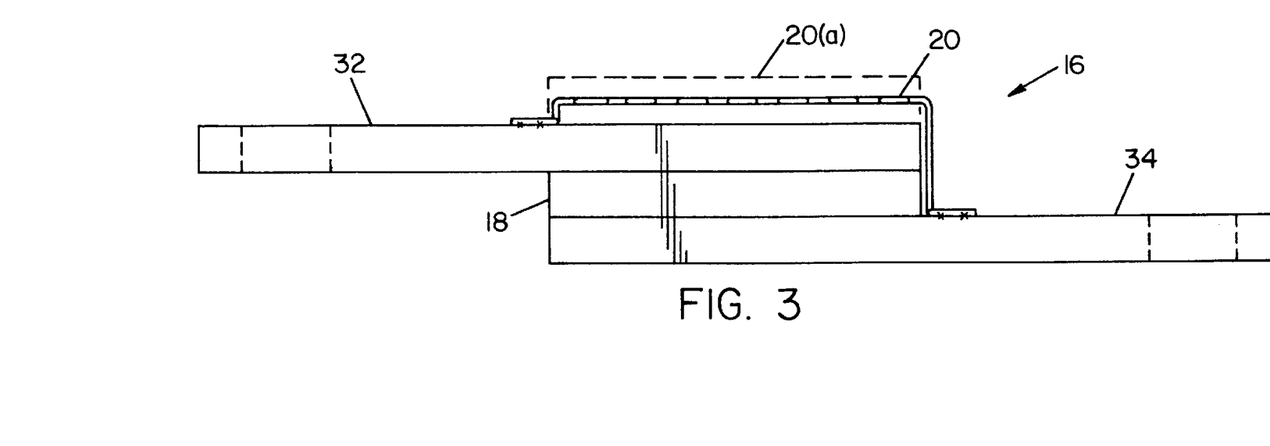
FIG. 3 is a side elevational view of the circuit protection device shown in FIG. 2.

Referring now to FIGS. 2 and 3, a preferred embodiment of a circuit protection device 16 is shown. Circuit protection device 16 is comprised of a pair of spaced apart electrodes, designated 32, 34 in the drawings. Disposed between electrodes 32, 34, in electrical conductive contact therewith, is current limiting device 18. In the embodiment shown, current limiting device 18 is comprised of a material exhibiting PTC characteristics.

The PTC device may be an electrically conductive polymeric material or ceramic material. Electrical conductivity is imparted to the aforementioned electrically non-conductive polymeric or ceramic host matrices through the addition of electrically conductive particulates thereto. Such electrically conductive particulates may comprise a variety of shapes and sizes ranging in shape from spheres to flakes to fibers. Mixtures of particulates having a variety of shapes is also contemplated.

Thermoplastic, thermoset or combinations of thermoplastic and thermoset polymeric materials are contemplated as host materials for the PTC device of the present invention. Metal oxide containing compositions such as ceramic materials or glasses are also contemplated as host materials.

Examples of electrically conductive particulates contemplated by the present invention include but are not limited to metals, metallic alloys, semi-metals such as carbon, graphite or intercalated graphite or metal coated electrically insulating particulates such as metal coated glass or ceramic spheres, flakes, fibers or whiskers.

The electrically conductive particulates must be added at a volume concentration that is in excess of the percolation threshold as determined by the chemistry and physical properties of the given host, by the geometry of the particulates and by the electrical conductivity of the particulates. Other factors may affect the percolation threshold such as the surface energies of the host and the particulates and the aspect ratio of the particulates, i.e., the ratio of the longest length of the electrically conductive particulates to the shortest length of the same particulates.

In general, any system comprised of a host material having itself a low electrical conductivity that contains an electrically conductive infrastructure wherein the electrical conductivity of the infrastructure is drastically reduced upon the heating and expansion of the host material would suffice for the PTC material of the present invention.

In accordance with one aspect of the present invention, shunt device 20 is disposed adjacent to, but spaced from, electrode 32, as best seen in FIG. 3. In the embodiment shown, shunt device 20 is a single wire element, dimensioned in accordance with the aforementioned method, and arranged in a serpentine fashion. One end of shunt device 20 is electrically connected to electrode 32 and the other end is electrically connected to electrode 34, to place shunt device 20 in parallel combination with current limiting device 18. Electrodes 32, 34 may be connected to shunt device 20 by a number of methods including welding, soldering, brazing or by a conductive adhesive.

In accordance with the present invention, shunt device 20 is positioned adjacent current limiting device 18 such that heat generated by shunt device 20 as current passes therethrough during a fault condition heats current limiting device 18.

In this respect, some PTC materials exhibit rather rapid switching times. In such cases, the PTC material may cool and switch back to its highly conductive state before the contactor has had a chance to break the circuit. If the PTC material returns to its highly conductive state, increased electric current would begin to flow through the PTC material. The source of the fault, having not been fixed, would send another fault through the PTC material sending the PTC material, once again, to its highly resistive state. With no way to "clamp" the PTC material in its highly resistive state, the system would begin and continue to oscillate. Such oscillations are undesirable. By positioning shunt device 20 in close proximity to the PTC material of current limiting device 18, heat emitted from shunt device 20 raises the temperature of the PTC material thereby "clamping" the PTC material in its highly resistive state.

It will be appreciated to those skilled in the art that the material forming shunt device 20 must be capable of conducting large electrical currents without deteriorating. Materials suitable for use include nickel wire, steel wire, stainless steel wire, tantalum wire, molybdenum wire, nichrome wire, tungsten wire, high temperature metal alloy wire, refractory metal wire, refractory metal alloy wire, metal oxides, electrically conductive composites, such as electrically conductive ceramics, fibrous composites, ceramic alloys, electrically conductive polymers and certain non-metals, such as carbon and graphite. An alternate embodiment of shunt device 20 in the form of a ceramic block 20(a) is illustrated in phantom in FIGS. 2 and 3. Shunt device 20(a) is shown mounted onto electrode 32, and is electrically connected to electrode 34 as generally illustrated in FIGS. 2 and 3.

Shunts designed by the methods disclosed herein for use with low power PTC materials are also contemplated. Specifically, the system illustrated by FIGS. 2 and 3 where the shunt, as determined by the methods of the present invention, is placed in the vicinity of the PTC material forming shunt device 20 so that the PTC material is subjected to the heat emitted from shunt device 20 and is thereby "clamped" in its highly resistive state, may find also utility with low power PTC materials.

Those of ordinary skill in the art will appreciate that a number of modifications and variations that can be made to specific aspects of the method, composition and apparatus of the present invention without departing from the scope of the present invention. Such modifications and variations are intended to be covered by the foregoing specification and the following claims.

Having described the invention, the following is claimed:

1. A circuit protection device for a 30 ampere circuit, comprised of:
    a current limiting device exhibiting PTC characteristics, said current limiting device having a lower resistance; and an upper resistance, the ratio of said upper to lower resistance being at least about $10^4$; and,
    a shunt device in parallel electrical connection with said current limiting device, said shunt device being a resistor formed from a material selected from the group consisting of nickel, steel, stainless steel, tantalum, molybdenum, nichrome, tungsten, electrically conductive ceramics, electrically conductive ceramic alloys and electrically conductive polymers, said shunt device having a resistance of about 0.5 ohms to about 0.7 ohms, wherein the resistance of said shunt device is equal to at least about 50 times the value of said lower resistance of said current limiting device, said shunt device being generally planar and being formed of an elongated wire arranged in a serpentine pattern, wherein said shunt device is parallel to and disposed in close proximity to said current limiting device, such that heat generated by said shunt device as current passes therethrough warms said current limiting device.

2. A circuit protection device as defined in claim 1, wherein said shunt device is formed of nichrome wire having a uniform cross-section.

3. A circuit protection device as defined in claim 2, wherein said nichrome wire is less than 60 mm in length and has a cross-sectional area greater than about 2 mm$^2$ and less than about 3 mm$^2$.

4. A circuit protection device for a 100 ampere circuit, comprised of:
    a current limiting device exhibiting PTC characteristics, said current limiting device having a lower resistance and an upper resistance, the ratio of said upper to lower resistance being at least about $10^4$; and
    a shunt device in parallel electrical connection with said current limiting device, said shunt device being a resistor formed from a material selected from the group consisting of nickel, steel, stainless steel, tantalum, molybdenum, nichrome, tungsten, electrically conductive ceramics, electrically conductive ceramic alloys and electrically conductive polymers, said shunt device having a resistance of about 0.10 ohms to about 0.30 ohms, wherein the resistance of said shunt device is equal to at least about 50 times the value of said lower resistance of said current limiting device, said shunt device being generally planar and being formed of an elongated wire arranged in a serpentine pattern, wherein said shunt device is parallel to and disposed in close proximity to said current limiting device, such that heat generated by said shunt device as current passes therethrough warms said current limiting device.

5. A circuit protection device as defined in claim 4, wherein said at least one resistive element is formed of nichrome wire having a uniform cross-section.

6. A circuit protection device as defined in claim 5, wherein said nichrome wire is less than 60 mm in length and has a cross-sectional area greater than about 5 mm² and less than about 10 mm².

7. A method for determining the resistance of a shunt for use with a current limiting device to protect an electrical circuit, said current limiting device exhibiting PTC characteristics and having a predetermined current carrying capacity, a lower resistance at said predetermined current carrying capacity and an upper resistance when said current limiting device is exposed to a current that exceeds said predetermined current carrying capacity, said method comprising the steps of:

(a) establishing a maximum current value to be carried by said shunt when said current limiting device is at said predetermined current carrying capacity;

(b) determining a minimum resistance for said shunt to enable said shunt to carry said maximum amount of current when said current limiting device is operating at said predetermined current carrying capacity;

(c) establishing a maximum voltage value the circuit to be protected can withstand;

(d) determining a maximum resistance for said shunt, such that a voltage rise established across said shunt when said current limiting device switches from said lower resistance to said upper resistance will not exceed said maximum voltage value;

(e) determining a maximum resistance for said shunt such that said current limiting device will not thermally degrade when said current limiting device switches from said lower resistance to said higher resistance;

(f) determining a minimum resistance for said shunt based upon a breaking capacity of a switching device in series with a parallel configuration of said current limiting device and said shunt; and (g) establishing a range of acceptable resistance values for said shunt device from values between the maximum of said minimum resistances and the minimum of said maximum resistances.

8. A method as defined in claim 7, further comprising the steps of:

(h) selecting a resistance value from said range of acceptable resistance values determined in step (g);

(i) selecting a conductive material for forming said shunt device;

(j) determining the switching energy to be absorbed by said shunt device without thermal degradation when said current limiting device switches from said lower resistance to said upper resistance;

(k) determining a cross-sectional area of said conductive material necessary to absorb said switching energy at said selected resistance value; and (l) establishing said determined cross-sectional area as a minimum cross-sectional area for said shunt device.

9. A method as defined in claim 8, wherein said shunt device is an elongated wire element, and further comprises the steps of:

(m) selecting a maximum length for said wire;

(n) determining a cross-sectional area for said wire using $S=\rho L_{max}/R_s$, wherein $R_s$ is said selected resistance value, $L_{max}$ is said predetermined maximum length of said wire, and $\rho$ is the electrical resistivity of the material forming said wire element; and (o) establishing said cross-sectional area determined in step (n) as a maximum cross-sectional value of said wire element.

10. A method as defined in claim 8, further comprising the steps of:

(m) selecting a maximum weight for said shunt device;

(n) determining a cross-sectional area for said shunt device using $S=(\rho W_{max}/\rho_m R_s)^{1/2}$, wherein $R_s$ is said selected resistance value, $W_{max}$ is said maximum weight, $\rho$ is the electrical resistivity and $\rho_m$ is the mass density of said conductive material;

(o) establishing said cross-sectional area determined in step (n) as a maximum cross-sectional value of said shunt device.

* * * * *